United States Patent [19]

Hart

[11] Patent Number: 5,102,042

[45] Date of Patent: Apr. 7, 1992

[54] ELECTRICAL SYSTEM FOR CONTROLLING THE OPERATION OF A HEAT EXCHANGER, CONTROL DEVICE THEREFOR AND METHODS OF MAKING THE SAME

[75] Inventor: Lee A. Hart, Holland, Mich.

[73] Assignee: Robertshaw Controls Company, Richmond, Va.

[21] Appl. No.: 626,310

[22] Filed: Dec. 12, 1990

[51] Int. Cl.$^5$ .............................................. F23N 5/20
[52] U.S. Cl. ................................ 236/78 R; 236/46 R
[58] Field of Search ................ 236/46 R, 78 D, 78 R; 165/12

[56] References Cited

U.S. PATENT DOCUMENTS

| 4,091,993 | 5/1978 | Knecht et al. | 236/46 R |
| 4,249,696 | 2/1981 | Donnelly et al. | 236/46 R |
| 4,632,303 | 12/1986 | Rodittis | 236/46 R |

OTHER PUBLICATIONS

Known to provide system having second transformer to operate relay. See FIG. 1 of application.

Known to use triac to operate relay and have only a two winding second transformer.

*Primary Examiner*—William E. Wayner
*Attorney, Agent, or Firm*—Candor, Candor & Tassone

[57] ABSTRACT

An electrical system for controlling the operation of a heat exchanger, control device therefor and methods of making the same are provided, the system comprising a first electrical transformer, a relay for causing the heat exchanger to be in one condition thereof when the relay is activated and for causing the heat exchanger to be in another condition thereof when the relay is deactivated, a switch for placing the relay across the secondary winding of the first transformer to activate the relay when the switch is in one condition thereof and to deactivate the relay when the switch is in another condition thereof, and a second transformer having a low voltage high current winding disposed in series with the switch when the switch is in one condition thereof so as to supply power to the low voltage high current winding and to increase the current flow from the secondary winding through the relay to activate the relay, the second transformer having only one other winding, that is so arranged that power is supplied to the other winding when the switch is in the other condition thereof.

12 Claims, 1 Drawing Sheet

ELECTRICAL SYSTEM FOR CONTROLLING THE OPERATION OF A HEAT EXCHANGER, CONTROL DEVICE THEREFOR AND METHODS OF MAKING THE SAME

BACKGROUND OF THE INVENTION

1. Field of the Invention

This invention relates to a new system for controlling the operation of a heat exchanger means and to a new control device for such a system as well as to new methods of making the system and the control device.

2. Prior Art Statement

It is known to provide an electrical system for controlling the operation of a heat exchanger means, the system comprising a first electrical transformer having a primary winding and a secondary winding, a relay means for causing the heat exchanger means to be in one condition thereof when the relay means is activated and for causing the heat exchanger means to be in another condition thereof when the relay means is deactivated, electrical circuit means interconnected to the relay means and the secondary winding and having switch means therein for placing the relay means across the secondary winding in a manner to activate the relay means when the switch means is in one condition thereof and to deactivate the relay means when the switch means is in another condition thereof, control means operatively interconnected to the circuit means and being adapted to determine when the relay means should be activated and when the relay means should be deactivated, and a second transformer having a low voltage high current winding disposed in the circuit means in a manner to be in series with the switch means when the switch means is in one condition thereof so as to supply power to the low voltage high current winding and to increase the current flow from the secondary winding of the first transformer through the relay means to activate the relay means. For example, see FIG. 1 of this application wherein the switch means of the prior known system is operated by a relay coil.

However, it is also known to have such a switch means comprise a triac that has its gate operated by a signal directed directly thereto from the control means of the system, such prior known system also having the second transformer provided with only two windings of which only one has its opposed ends interconnected to the control means of the system.

SUMMARY OF THE INVENTION

It is one feature of this invention to provide a new system for controlling the operation of a heat exchanger means wherein the electrical circuit means thereof is adapted to handle DC load currents as well as AC load currents.

In particular, it was found that many systems do not use a contactor, such as a relay means, as the external load device. For example, electronic devices are sometimes used which can add a substantial DC current offset.

However, it was found according to the teachings of this invention that a system can be provided to handle such DC load currents as well as AC load currents if the second transformer of the system has only one other winding than the low voltage high current winding thereof and if that other winding is supplied power when the switch means is in the other condition thereof.

For example, one embodiment of this invention provides an electrical system for controlling the operation of a heat exchanger means, the system comprising a first electrical transformer having a primary winding and a secondary winding, a relay means for causing the heat exchanger means to be in one condition thereof when the relay means is activated and for causing the heat exchanger means to be in another condition thereof when the relay means is deactivated, electrical circuit means interconnected to the relay means and to the secondary winding and having switch means therein for placing the relay means across the secondary winding in a manner to activate the relay means when the switch means is in one condition thereof and to deactivate the relay means when the switch means is in another condition thereof, control means operatively interconnected to the circuit means and being adapted to determine when the relay means should be activated and when the relay means should be deactivated, and a second transformer having a low voltage high current winding disposed in the circuit means in a manner to be in series with the switch means when the switch means is in the one condition thereof so as to supply power to said low voltage high current winding and to increase the current flow from the secondary winding of the first transformer through the relay means to activate the relay means, the second transformer having only one other winding that is so arranged that the electrical circuit means supplies power to the other winding when the switch means is in the other condition thereof.

It is another feature of this invention to provide an electrical system for controlling the operation of a heat exchanger means wherein a transformer of the system can be used to trigger a semiconductive device, such as a triac or an SCR, as the load switching element.

In particular, it was found according to the teachings of this invention that a third winding can be added to a transformer of the system to provide a gate trigger signal for the triac.

For example, another embodiment of this invention comprises an electrical system for controlling the operation of a heat exchanger means, the system comprising a first electrical transformer having a primary winding and a secondary winding, a relay means for causing the heat exchanger means to be in one condition thereof when the relay means is activated and for causing the heat exchanger means to be in another condition thereof when the relay means is deactivated, electrical circuit means interconnected to the relay means and the secondary winding and having switch means therein for placing the relay means across the secondary winding in a manner to activate the relay means when the switch means is in one condition thereof and to deactivate the relay means when the switch means is in another condition thereof, control means operatively interconnected to the circuit means and being adapted to determine when the relay means should be activated and when the relay means should be deactivated, and a second transformer having a low voltage high current winding means disposed in the circuit means in a manner to be in series with the switch means when the switch means is in the one condition thereof so as to increase the current flow from the secondary winding of the first transformer through the relay means to activate the relay means, the switch means comprising a triac having a gate, the second transformer having a second winding that controls the gate of the triac.

Therefore, it is an object of this invention to provide a new electrical system for controlling the operation of a heat exchanger means, the system of this invention having one or more of the novel features of this invention as set forth above or hereinafter shown or described.

Another object of this invention is to provide a new method of making such a system, the method of this invention having one or more of the novel features of this invention as set forth above or hereinafter shown or described.

Another object of this invention is to provide a new control device for controlling the operation of a heat exchanger means, the control device of this invention having one or more of the novel features of this invention as set forth above or hereinafter shown or described.

Another object of this invention is to provide a new method of making such a control device, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
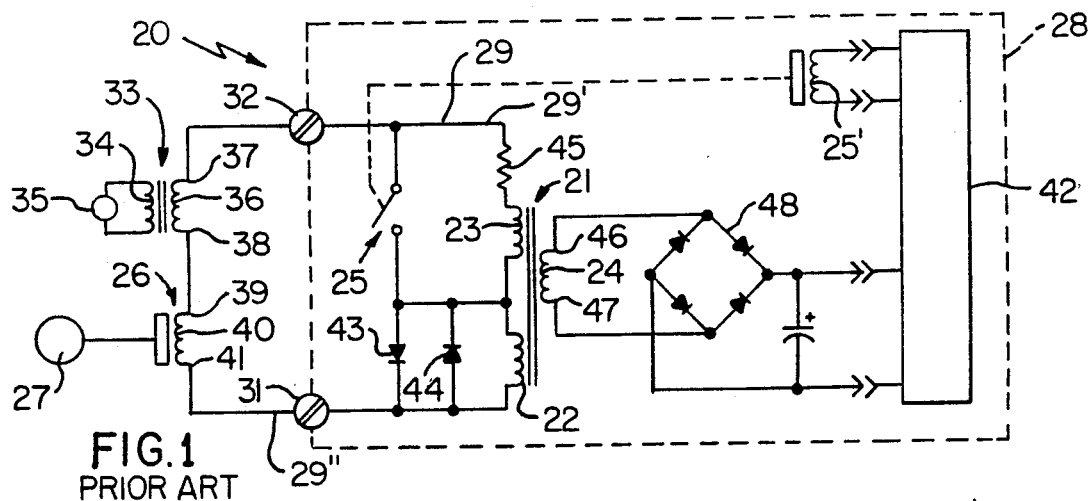
FIG. 1 is a schematic view illustrating a prior known system for controlling the operation of a heat exchanger means.

While the various features of this invention are hereinafter illustrated and described as being particularly adapted to provide load switching for electronic thermostat means, it is to be understood that the various features of this invention can be utilized singly or in various combinations thereof to provide load switching for other types of thermostat means, as desired.

Therefore, this invention is not to be limited to only the embodiments illustrated in the drawings, because the drawings are merely utilized to illustrate one of the wide variety of uses of this invention.

It is well known that heating, ventilating and air conditioning (HVAC) control circuits each traditionally consist of three devices, namely, a twenty-four volt AC transformer to supply power, a thermostat which decides when heating or cooling is needed, and a relay, contactor, or valve that causes the actual HVAC equipment to be in one condition thereof or in another condition thereof, such as on or off.

In the past, the thermostat of such a circuit usually had a temperature actuated switch contact. However, modern thermostats are more likely to use an electronic switch, such as a triac, SCR or transistor, and these devices have advantages in cost, size, reliability and life.

However, such electronic thermostats do not perform the same as an actual switch contact as they have a larger ON-state voltage drop, or OFF-state leakage current and unusual or nonlinear switching characteristics. For example, triac or SCR based thermostats usually produce "spikes" at the start of each AC half cycle. Other common problems of electronic thermostats include, less voltage to actuate the relay, contactor or valve causing marginal or incorrect operation under worst case conditions (low AC line voltage, etc.); heat generation inside the thermostat causing it to misread room temperatures; buzzing, chattering or overheating in relays, valves, contactors and transformers due to the lower, nonsinusoidal voltage; transformer overheating and shortened life due to the thermostat introducing a DC offset voltage; electrical interference that may cause malfunctions in nearby electronic equipment; compatibility problems with electronic ignition systems, due to excessive current drain in the OFF-state; etc.

One prior known means that has been utilized to reduce or eliminate the above effects in electronic thermostats comprises a transformer-relay system that is generally indicated by the reference numeral 20 in FIG. 1 and utilizes a transformer 21 that has three windings 22, 23 and 24 and a switch means 25 that is operated by a coil 25' in a manner well known for electrical relays to switch an external load device 26 of a heat exchanger 27, such as a HVAC apparatus, in a manner hereinafter set forth so as to cause the heat exchanger to be in another condition thereof.

The prior known system 20 comprises a control device 28 having an internal portion 29' of an electrical circuit means 29 therein that is adapted to be interconnected to an external portion 29" of the circuit means 29 by terminals 31 and 32 in a conventional manner, the external portion 29" of the circuit means 29 comprising a transformer 33 having a primary winding 34 interconnected to a source 35 of alternating current and a secondary winding 36 having one side 37 interconnected to the terminal 32 and the other side 38 thereof interconnected to one side 39 of a relay coil 40 that has its other side 41 interconnected to the terminal 31.

In this manner when a control means 42 of the control device 28 determines that the heat exchanger means 27 should be in one condition thereof, such as be turned on, the control means 42 energizes the coil 25' to cause the switch 25 to close and energize the coil 40 of the device 26 to operate the heat exchanger means 27 in a certain manner. Conversely, when the control means 42 determines that the heat exchanger means 27 should be in another condition thereof, such as be turned off, the control means 42 ceases to energize the coil 25' so that the switch means 25 opens and the coil means 40 is deenergized in such a manner that the device 26 causes the heat exchanger 27 to be operated in another manner thereof.

The winding 22 of the transformer 21 is a low voltage high current winding, typically 1 VAC at 100 mA.

The circuit means 29 includes diodes 43 and 44 interconnected in the circuit means 29 in the manner illustrated in FIG. 1 so as to prevent the voltage of the winding 22 of the transformer 21 from rising above the 1 VAC level at higher currents.

The winding 23 of the transformer 21 is wound for approximately a 24:1 step-up, such as 24 VAC at 4 mA.

The winding 24 of the transformer 21 is a secondary winding and is chosen for whatever supply voltage is required to power the thermostat control logic (not shown) of the control means 42. However, this current is low so a resistor 45 is disposed in the circuit means 29 and for the purpose of this description, it will be assumed that the supply voltage required to power the thermostat logic of the control means 42 is 10 VAC.

When switch means 25 is open as illustrated in FIG. 1, a small electrical current flows from the external transformer 33 through the resistor 45 and the windings 23 and 22 of the transformer 21 as the windings 23 and 22 are disposed in series across the secondary winding 36 of the transformer 33. This electrical current is low so the resistor 45 has a negligible voltage drop and most of the voltage appears across the winding 23 of the transformer 21 so that by transformer action, the voltage across the winding 24 of the transformer 21 is thus approximately 10 VAC to power the control logic of the control means 42, the winding 24 of the transformer 21 having the opposed sides 46 and 47 thereof interconnected by the circuit means 29 to two opposite points of a diode bridge 48 that has the other two opposite points thereof interconnected to the control means 42 by the circuit means 29 as illustrated in FIG. 1.

When the control logic of the control means 42 activates the coil 25', the activated coil 25' closes the switch 25 so that current from the external transformer 33 now only flows through the closed switch 25 and the winding 22 of the transformer 21 as the closed switch 25 and winding 22 of the transformer 21 are disposed in series across the secondary winding 36 of the transformer 33 while the winding 23 is disposed in parallel with the closed switch means 25 across the secondary winding 36 of the transformer 33. Since the closed switch 25 and the winding 22 of the transformer 21 have at most a 1 VAC drop (limited by the diodes 43 and 44), the electrical current flow through the coil 40 of the external contactor 26 increases substantially so that the external contactor 26 pulls in and changes the condition of the heat exchanger 27.

The 1 VAC across the winding 22 of the transformer 21 is stepped up by the transformer action to 10 VAC in the winding 24 of the transformer 21 so that the control logic in the control means 42 remains powered regardless of whether the switch 25 is open or closed and the resistor 45 limits the current supplied by the winding 23 of the transformer 21 through the closed switch 25.

However, many systems do not use a contactor, such as a relay means 26 as the external load device. For example, electronic devices are sometimes used which can add a substantial DC current offset.

Figure 2:
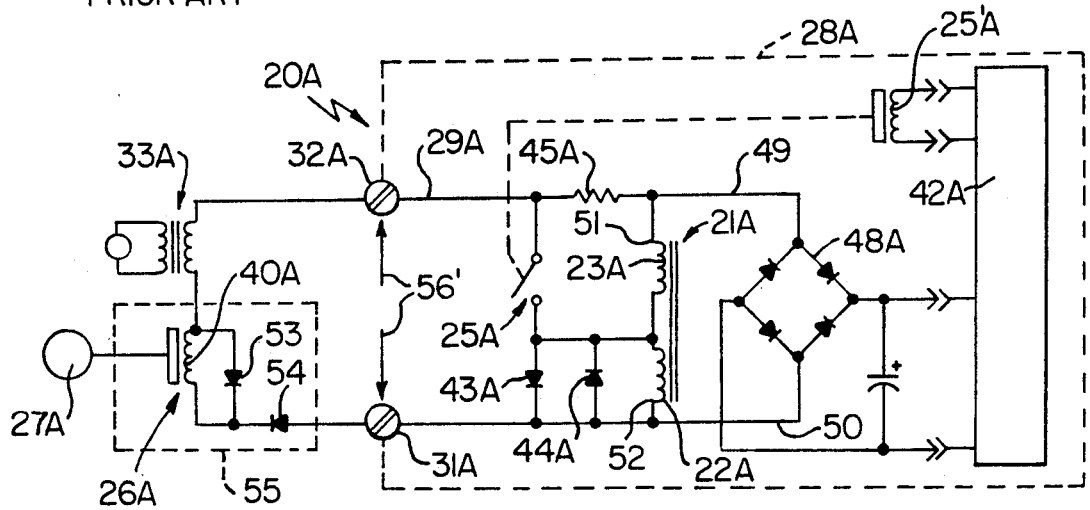
FIG. 2 is a view similar to FIG. 1 and illustrates a new system of this invention for controlling the operation of a heat exchanger means.

The new system 20A of FIG. 2 of this invention is adapted to handle such DC load currents as well as AC currents, the system 20A of this invention having the parts thereof that are similar to the parts of the system 20 previously described indicated by like reference numerals followed by the reference letter "A".

As illustrated in FIG. 2, it can be seen that the transformer 21A has the winding 24 of the transformer 21 of FIG. 1 eliminated and the control logic 42A is powered directly from the winding 23A as the leads 49 and 50 of the circuit means 29A directly interconnect to the two opposite points of the diode bridge 48A and are respectively interconnected to the opposite sides 51 and 52 of the windings 22A and 23A of the transformer 21A that are disposed in series between the leads 49 and 50 as illustrated.

The winding 23A of the transformer 21A is chosen to deliver the voltage required by the control logic in the control means 42A, such as for the previously described example of 10 VAC.

When the switch means 25A is open as illustrated in FIG. 2, a small current flows from the external transformer 33A through the resistor 45A and windings 23A and 22A of the transformer 21A. The voltage across the winding 22A is clamped by the diodes 43A and 44A to 1 VAC so that the transformer action causes the voltage across the winding 23A to be 10 VAC. The remainder of the input voltage is dropped across the resistor 45A.

However, when the control logic of the control means 42A activates the relay coil 25'A, the switch means 25A is closed and the electrical current from the external transformer 33A now flows only through the closed switch 25A and the winding 22A of the transformer 21A. Since the closed switch means 25A and the winding 22A of the transformer 21A have at most a 1 VAC drop (limited by the diodes 43A and 44A), the current increases substantially through the coil 40A of the external contactor 26A so that the contactor 26A pulls in and causes the heat exchanger means 27A to be in another condition thereof. The 1 VAC across the winding 22A of the transformer 21A is stepped up by transformer action to 10 VAC in the winding 23A. Thus, the control logic of the control means 42A remains powered regardless of whether the switch 25A is open or closed, the resistor 45A limiting the current supplied by the winding 23A through the closed switch means 25A.

Thus, it can be seen that the system 20A of this invention operates substantially the same as the system 20 previously described when the contactor 26A is to utilize alternating current.

However, the system 20A can be modified so that the same can operate with pulsating DC current so that the contactor 26A could be an electronic device. For example, the system 20A previously described can be modified so that the coil 40A is a DC coil with rectifying diodes 53 and 54 as represented by the boxed area 55 of FIG. 2.

In this manner, one-half of the AC cycle is thus zero current and with the switch 25A in the open condition, pulsating DC current flows through the windings 22A and 23A of the transformer 21A, such pulsating DC current being represented by the arrows 56'at the terminals 31A and 32A of the control device 28A as illustrated in FIG. 2.

During the active half cycle, transformer action works as before to power the control logic in the control means 42A. However, during the inactive half cycle, current through the winding 22A tries to go to zero, but the transformer's core is still magnetized by the previous half cycle's current. The magnetic field collapses, discharging its energy through the diode 43A or the diode 44A as appropriate. The voltage across the winding 22A is still clamped to 1 VAC so the winding 23A of the transformer 21A is still 10 VAC and the control logic for the control means 42A remains powered.

When the control logic of the control means 42A activates the coil 25'A, the switch 25A closes. During the active half cycle, electrical current from the external transformer 33A flows through the closed switch 25A and the winding 22A of the transformer 21A. Since the closed switch 25A and the winding 22A of the transformer 21A have at most a 1 VAC drop (limited by the diode 43A or the diode 44A), the current increases substantially through the coil 40A and the contactor 26A pulls in changing the condition of the heat exchanger 27A. Transformer action applies 10 VAC across the winding 23A of the transformer 21A to power the control logic of the control means 42A as before.

However, during the inactive half cycle, no current flows in the winding 22A of the transformer 21A so there is no voltage. The control logic of the control means 42A remains powered by the energy stored in its power supply's filter capacitor or other storage medium (not shown) in a manner well known in the art.

Thus, the electrical current available for the control logic of the control means 42A is reduced when operating on pulsating DC but the supply voltage is relatively unaffected (approximately 10 VAC in this example). Most actual applications will have at least some current flowing in both AC half cycles, even if widely different. In such cases, the circuit operates substantially the same as if both half cycles have equal currents.

Therefore, it can be seen that the arrangement for the three winding transformer 21 of FIG. 1 can only be used with AC with little or no DC current whereas the two winding transformer 21A of the system 20A of this invention permits operation on AC or pulsating DC.

While the transformer 21A has been illustrated and described as having two windings 22A and 23A, it is to be understood that the transformer 21A could have a single winding and be provided with a center tap that, in effect, divides that single winding into two windings on each side of that tap that would be equivalent to the windings 22A and 23A as illustrated.

As previously stated, a prior known system 20 utilizes a semiconductor device for the switch means 25 thereof and has the control logic 42 directly interconnect a signal to the gate of that semiconductor device when the control logic determines that the heat exchanger 27 is to be in the other condition thereof, such arrangement having the transformer 21 thereof provided only with the two windings 22 and 24.

However, as previously stated, it was found according to the teachings of this invention that the gate of the semiconductor device can be controlled directly by a winding of the internal transformer.

Figure 3:
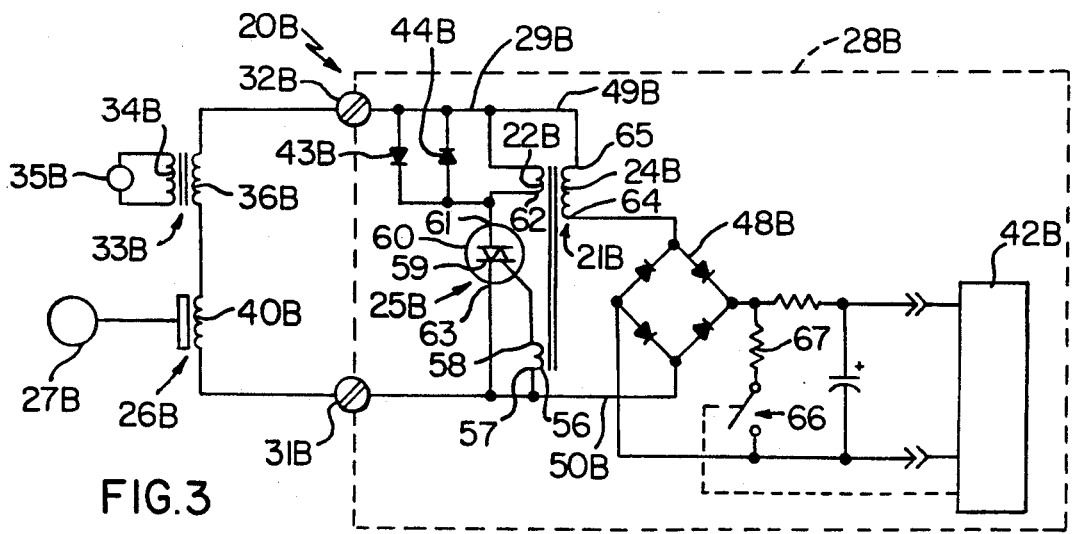
FIG. 3 is a view similar to FIG. 2 and illustrates another new system of this invention for controlling the operation of a heat exchanger means.

For example, another system of this invention is generally indicated by the reference numeral 20B in FIG. 3 and parts thereof similar to the systems 20 and 20A previously described are indicated by like reference numerals followed by the reference letter "B".

As illustrated in FIG. 3, the transformer 21B of the control device 28B has the two windings 22B and 24B as well as a third winding 56 that has one side 57 interconnected to the lead 50B of the circuit means 29B that leads to one point or corner of the diode bridge 48B while the other side 58 of the winding 56 is interconnected to a gate 59 of a semiconductor device 60, such as the triac as illustrated, the triac 60 comprising the switch means 25B for the system 20B for controlling the external contactor 26B in a manner hereinafter set forth.

The triac 60 has one side 61 thereof interconnected to one side 62 of the winding 22B of the transformer 21B while the other side 63 of the triac 60 is interconnected to the lead 50B of the circuit 29B.

In addition, it can be seen that one side 64 of the winding 24B of the transformer 21B is interconnected by the circuit 29B to one point or corner of the diode bridge 48B while the other side 65 of the winding 24B of the transformer 21B is interconnected to the lead 49B of the circuit means 29B as illustrated.

The control means 42B of the control device 28B operates a switch 66 of the circuit means 29B in a manner hereinafter set forth.

It can be seen that transformer 21B acts as a current transformer with the windings 22B, 24B and 56.

In particular, the winding 22B of the transformer 21B is a low voltage primary, typically 1 VAC, and the diodes 43B and 44B prevent the voltage from rising above this level in the circuit 29B. The winding 56 of the transformer 21B is a low voltage secondary, typically 2 VAC or as necessary to meet the gate trigger requirements of the triac 60. The winding 24B of the transformer 21B is a high voltage secondary, typically 6 to 12 VAC and it powers the thermostat control logic of the control means 42B.

The control system 20B as made by the method of this invention as previously described, operates in the following manner.

The switch 66 is a typically solid state device, such as a transistor, controlled by the thermostat control logic of the control means 42B. Therefore, assume that the switch 66 is in an open condition as illustrated in FIG. 3 whereby the control logic of the control means 42B takes very little power so very little electrical current flows through the winding 24B of the transformer 21B. Accordingly, transformer action thus induces a very little current in the winding 56 so that no gate drive is applied to the triac 60 so that the switch means 25B is, in effect, open as the triac 60 stays off. Thus, the contactor 26B is in a deactivated condition thereof as previously described so that the heat exchanger 27B is in one condition thereof.

Now assume that the thermostat control logic of the control means 42B closes the switch 66. The closing of the switch 66 causes a resistor 67 of the circuit means 29B to draw much more current than the control logic so that the current in the winding 24B of the transformer 21B increases significantly. Accordingly, transformer action thus induces a much larger electrical current in the winding 56 of the transformer 21B that is sufficient to trigger the triac 60 to its "on" condition. The turning on of the triac 60 causes current to flow from the external transformer 33B through the triac 60, the winding 22B of transformer 21B and the external load relay coil 40B to cause the external contactor 26B to pull in and change the condition of the heat exchanger 27B as previously set forth.

When the triac 60 is "on", there is very little voltage drop across it. Thus no voltage would be available to power the control logic. However, the winding 22B of the transformer 21B corrects this. The external relay load current causes a small voltage drop across the winding 22B which by transformer action is stepped up by the winding 56 sufficiently to power the control logic for the control means 42B.

It is to be understood that snubbing networks are not shown for the circuit 29B but are of course necessary in any triac circuit to keep dV/dt and dI/dt within specifications. However, such networks are widely known as part of the state of the art and are not shown for clarity.

It is believed that the system 20B of this invention reduces the ON-state voltage drop of an electronic thermostat to approximately 2.5 VAC maximum; reduces self-heating in the thermostat (lower ON-state voltage drop decreases heat generated in the thermostat); has a low cost as transformers such as 21B need to handle only milliwatts of power and so are very small and inexpensive; and improves compatibility with electronic ignition controls by making the thermostat "look" more like an ideal switch contact as it eliminates the "spike" at the beginning of each AC cycle characteristic of other triac or SCR designs as such a spike would cause erratic operation with electronic ignition controls.

It is to be understood that other types of semiconductor switches can be substituted for the triac 60, such as an SCR inside a diode bridge. However, it is believed that the triac is the preferred implementation since it intrinsically handles AC and results in the simplest circuit.

Therefore, it can be seen that this invention not only provides new systems for operating heat exchangers as well as new control devices for such systems, but also, this invention provides new methods of making such systems and such control devices.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a control device for an electrical system for controlling the operation of a heat exchanger means, said system comprising a first electrical transformer having a primary winding and a secondary winding, and a relay means for causing said heat exchanger means to be in one condition thereof when said relay means is activated and for causing said heat exchanger means to be in another condition thereof when said relay means is deactivated, said control device comprising electrical circuit means adapted to be interconnected to said relay means and said secondary winding and having switch means therein for placing said relay means across said secondary winding in a manner to activate said relay means when said switch means is in one condition thereof and to deactivate said relay means when said switch means is in another condition thereof, control means operatively interconnected to said circuit means and being adapted to determine when said relay means should be activated and when said relay means should be deactivated, and a second transformer having a low voltage high current winding disposed in said circuit means in a manner to be in series with said switch means when said switch means is in said one condition thereof so as to increase the current flow from said secondary winding of said first transformer through said relay means to activate said relay means, said switch means comprising a triac having a gate, the improvement comprising the step of forming said second transformer to have a second winding that controls said gate of said triac.

2. In an electrical system for controlling the operation of a heat exchanger means, said system comprising a first electrical transformer having a primary winding and a secondary winding, a relay means for causing said heat exchanger means to be in one condition thereof when said relay means is activated and for causing said heat exchanger means to be in another condition thereof when said relay means is deactivated, electrical current means interconnected to said relay means and said secondary winding and having switch means therein for placing said relay means across said secondary winding in a manner to activate said relay means when said switch means is in one condition thereof and to deactivate said relay means when said switch means is in another condition thereof, control means operatively interconnected to said circuit means and being adapted to determine when said relay means should be activated and when said relay means should be deactivated, and a second transformer having a low voltage high current winding disposed in said circuit means in a manner to be in series with said switch means when said switch means is in said one condition thereof so as to supply power to said low voltage high current winding and to increase the current flow from said secondary winding of said first transformer through said relay means to activate said relay means, said second transformer having only one other winding that is so arranged that said electrical circuit means supplies power to said other winding when said switch means is in said other condition thereof, the improvement wherein said control means is interconnected by said circuit means across said secondary winding of said first transformer and in parallel with said windings of said second transformer.

3. A system as set forth in claim 2 wherein said control means comprises a bridge of diodes that is interconnected by said circuit means across said secondary winding of said first transformer.

4. In an electrical system for controlling the operation of a heat exchanger means, said system comprising a first electrical transformer having a primary winding and a secondary winding, a relay means for causing said heat exchanger means to be in one condition thereof when said relay means is activated and for causing said heat exchanger means to be in another condition thereof when said relay means is deactivated, electrical circuit means interconnected to said relay means and said secondary winding and having switch means therein for placing said relay means across said secondary winding in a manner to activate said relay means when said switch means is in one condition thereof and to deactivate said relay means when said switch means is in another condition thereof, control means operatively interconnected to said circuit means and being adapted to determine when said relay means should be activated and when said relay means should be deactivated, and a second transformer having a low voltage high current winding disposed in said circuit means in a manner to be in series with said switch means when said switch means is in said one condition thereof so as to increase the current flow from said secondary winding of said first transformer through said relay means to activate said relay means, said switch means comprising a triac having a gate, the improvement wherein said second transformer has a second winding that controls said gate of said triac.

5. A system as set forth in claim 4 wherein said second transformer has a third winding disposed in parallel with said low voltage high current winding thereof across said secondary winding of said first transformer 6. A system as set forth in claim 4 wherein said circuit means interconnects one side of said second winding of said second transformer to said gate of said triac and the other side of said second winding of said second transformer to one side of said secondary winding of said first transformer.

7. In a method of making an electrical system for controlling the operation of a heat exchanger means, said system comprising a first electrical transformer having a primary winding and a secondary winding, a relay means for causing said heat exchanger means to be in one condition thereof when said relay means is activated and for causing said heat exchanger means to be in another condition thereof when said relay means is deactivated, electrical circuit means interconnected to said relay means and said secondary winding and having switch means therein for placing said relay means across said secondary winding in a manner to activate said relay means when said switch means is in one condition thereof and to deactivate said relay means when said switch means is in another condition thereof, control means operatively interconnected to said circuit means and being adapted to determine when said relay means should be activated and when said relay means should be deactivated, and a second transformer having a low voltage high current winding disposed in said circuit means in a manner to be in series with said switch means when said switch means is in said one condition thereof so as to increase the current flow from said secondary winding of said first transformer through said relay means to activate said relay means, said switch means comprising a triac having a gate, the improvement comprising the step of forming said second transformer to have a second winding that controls said gate of said triac.

8. In a control device for an electrical system for controlling the operation of a heat exchanger means, said system comprising a first electrical transformer having a primary winding and a secondary winding, and a relay means for causing said heat exchanger means to be in one condition thereof when said relay means is activated and for causing said heat exchanger means to be in another condition thereof when said relay means is deactivated, said control device comprising electrical circuit means adapted to be interconnected to said relay means and said secondary winding and having switch means therein for placing said relay means across said secondary winding in a manner to activate said relay means when said switch means is in one condition thereof and to deactivate said relay means when said switch means is in another condition thereof, control means operatively interconnected to said circuit means and being adapted to determine when said relay means should be activated and when said relay means should be deactivated, and a second transformer having a low voltage high current winding disposed in said circuit means in a manner to be in series with said switch means when said switch means is in said one condition thereof so as to supply power to said low voltage high current winding and to increase the current flow from said secondary winding of said first transformer through said relay means to activate said relay means, said second transformer having only one other winding that is so arranged that said electrical circuit means is adapted to supply power to said other winding when said switch means is in said other condition thereof, the improvement wherein said control means is adapted to be interconnected by said circuit means across said secondary winding of said first transformer and in parallel with said windings of said second transformer.

9. A control device as set forth in claim 8 wherein said control means comprises a bridge of diodes that is adapted to be interconnected by said circuit means across said secondary winding of said first transformer.

10. In a control device for an electrical system for controlling the operation of a heat exchanger means, said system comprising a first electrical transformer having a primary winding and a secondary winding, and a relay means for causing said heat exchanger means to be in one condition thereof when said relay means is activated and for causing said heat exchanger means to be in another condition thereof when said relay means is deactivated, said control device comprising electrical circuit means adapted to be interconnected to said relay means and said secondary winding and having switch means therein for placing said relay means across said secondary winding in a manner to activate said relay means when said switch means is in one condition thereof and to deactivate said relay means when said switch means is in another condition thereof, control means operatively interconnected to said circuit means and being adapted to determine when said relay means should be activated and when said relay means should be deactivated, and a second transformer having a low voltage high current winding disposed in said circuit means in a manner to be in series with said switch means when said switch means is in one condition thereof so as to increase the current flow from said secondary winding of said first transformer through said relay means to activate said relay means, said switch means comprising a triac having a gate, the improvement wherein said second transformer has a second winding that controls said gate of said triac.

11. A control device as set forth in claim 10 wherein said second transformer has a third winding adapted to be disposed in parallel with said low voltage high current winding thereof across said secondary winding of said first transformer.

12. A control device as set forth in claim 10 wherein said circuit means interconnects one side of said second winding of said second transformer to said gate of said triac and is adapted to interconnect the other side of said second winding of said second transformer to one side of second secondary winding of said first transformer.

* * * * *

UNITED STATES PATENT AND TRADEMARK OFFICE
CERTIFICATE OF CORRECTION

PATENT NO. : 5,102,042
DATED : April 7, 1992
INVENTOR(S) : Lee A. Hart

It is certified that error appears in the above—identified patent and that said Letters Patent is hereby corrected as shown below:

Column 9, line 67, cancel "current" and insert --circuit--.

Signed and Sealed this

Twenty-ninth Day of June, 1993

Attest:

MICHAEL K. KIRK

Attesting Officer

Acting Commissioner of Patents and Trademarks